United States Patent [19]

Stuller et al.

[11] 4,352,608
[45] Oct. 5, 1982

[54] REMOTELY POSITIONED INTAKE APPARATUS FOR A PNEUMATIC CONVEYING SYSTEM AND METHOD OF USING SAME

[75] Inventors: Howard E. Stuller; Jimmie L. Francis, both of Lubbock, Tex.

[73] Assignee: Stuller Engineering & Marketing Services, Lubbock, Tex.

[21] Appl. No.: 188,451

[22] Filed: Sep. 17, 1980

Related U.S. Application Data

[63] Continuation of Ser. No. 55,353, Jul. 6, 1979, abandoned, which is a continuation of Ser. No. 855,886, Nov. 30, 1977, abandoned.

[51] Int. Cl.$^3$ ............................................. B65G 53/40
[52] U.S. Cl. .................................................... 406/116
[58] Field of Search ............... 406/38, 39, 113, 115, 406/116, 151, 164, 165, 166, 167; 193/3, 16, 17; 414/304

[56] References Cited

U.S. PATENT DOCUMENTS

| 3,179,264 | 4/1965 | Tallquist | 414/304 |
| 3,205,017 | 9/1965 | Story et al. | 406/116 |
| 3,228,728 | 1/1966 | Beckett et al. | 406/116 |
| 3,273,942 | 9/1966 | McFarland | 406/115 |
| 3,651,964 | 3/1972 | Nieboer | 193/3 X |
| 4,042,130 | 8/1977 | Legille et al. | 193/16 X |

Primary Examiner—James L. Rowland
Attorney, Agent, or Firm—Pravel, Gambrell, Hewitt, Kirk, Kimball & Dodge

[57] ABSTRACT

A new and improved remotely positioned intake system for use with a pneumatic conveying system and in particular for feeding boll cotton to a cotton ginning operation. The system includes a frame assembly that supports a downwardly extending intake tube or conduit having an inlet opening and which is movable from a remote location. The intake tube is supported from a movable carriage on the support frame for increased loading capability.

1 Claim, 6 Drawing Figures

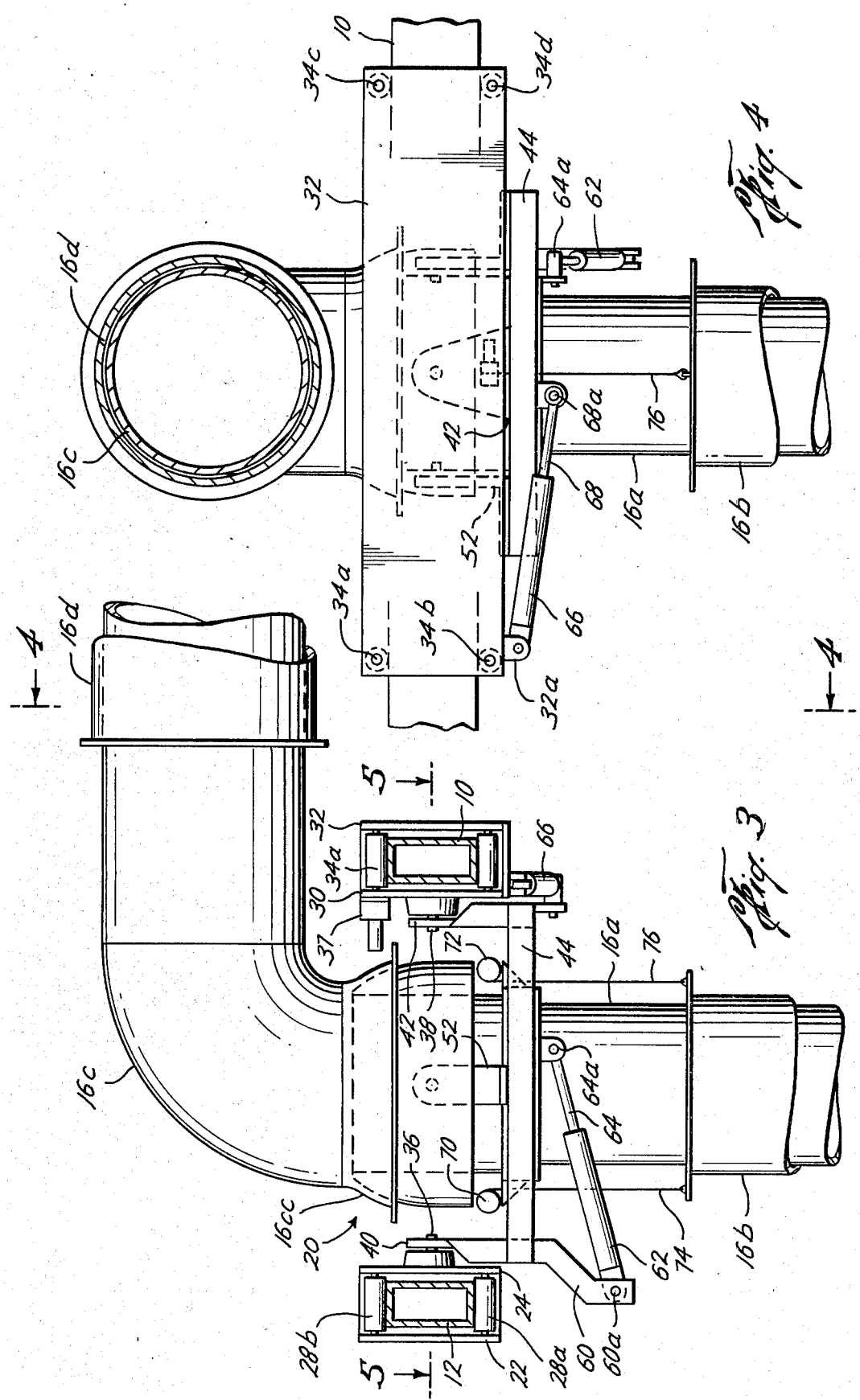

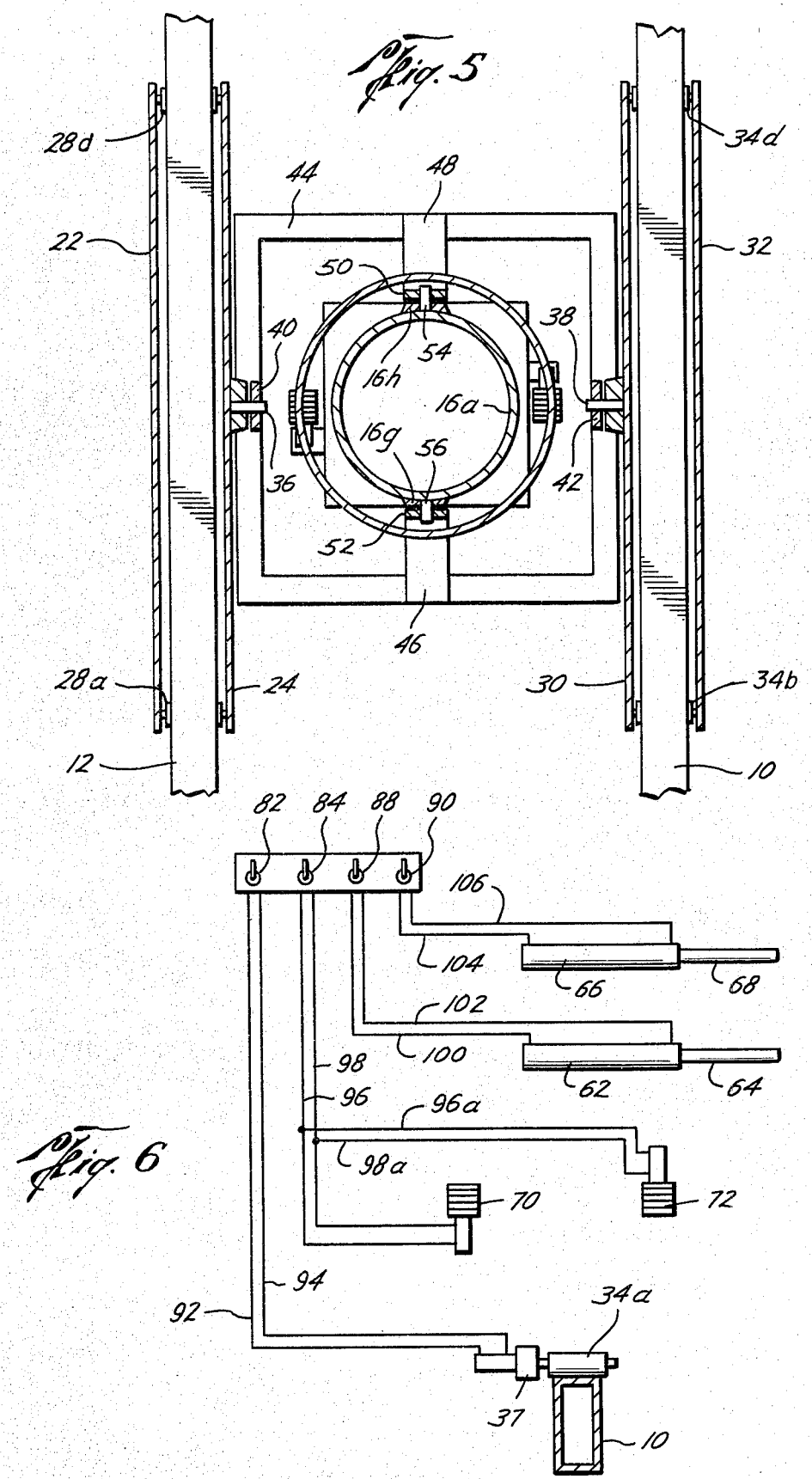

REMOTELY POSITIONED INTAKE APPARATUS FOR A PNEUMATIC CONVEYING SYSTEM AND METHOD OF USING SAME

This is a continuation of application Ser. No. 55,353, filed July 6, 1979, now abandoned, which is a continuation of application Ser. No. 855,866, also abandoned.

BACKGROUND OF THE INVENTION

This invention relates generally to the field of materials handling and in particular to a remote controlled intake apparatus for a pneumatic conveying intake system for cotton gins.

In the prior art, a large diameter flexible suction tube or conduit was used to unload picked boll cotton from trailers and the like for processing in a cotton gin. The large diameter suction tube was manually positioned and supported during operation and which was rapidly fatiguing to the individual involved. Such unloading operations are also done under the unpleasant conditions of high heat and dust which further limited the expected time which an individual could manually be expected to effectively perform this operation. To overcome this limitation it has been the practice to have two individuals who alternated in performing the manual operation. This requirement essentially doubled the cost of such operation.

U.S. Pat. No. 308,790 to Munger is particularly relevant to the present invention as it discloses the known state of the art. Munger U.S. Pat. No. 509,759 relates to an improvement on the discharge portion of the suction line and not to the features of the present invention.

U.S. Pat. No. 1,455,764 discloses a pneumatic elevator for seed cotton, but again no remote control operating means is disclosed. This is also true of U.S. Pat. No. 582,542. U.S. Pat. No. 2,189,099 discloses essentially the same manual pick-up or suction arrangement and adds a drying system for the cotton.

U.S. Pat. No. 3,013,649 discloses a wagon unloader that is partially automated. The jib crane comprises a swingable arm 83 mounted on a piston post 84 that is hydraulically actuated, but lacks the basic remote controlled function of the present invention.

U.S. Pat. No. 2,569,190 discloses certain aspects of material handling, while U.S. Pat. No. 1,042,703 relates to an automatic grain transfer apparatus.

Each of the aforementioned patents is hereby totally incorporated herein by this reference for any and all purposes.

SUMMARY OF THE INVENTION

A new and improved remote controlled intake system for a pneumatic conveying system.

The intake system includes an intake tube or conduit supported by a movable carriage on an overhead support frame. The downwardly extending portion of the intake tube is manipulated by an operator using hydraulic means from a remote location to feed flowable material, preferably cotton bolls, into the pneumatic conveying system.

BRIEF DESCRIPTION OF THE DRAWINGS

FIG. 3 is a view taken along line 3—3 of FIG. 2;

FIG. 4 is a view taken along line 4—4 of FIG. 3;

FIG. 5 is a view taken along line 5—5 of FIG. 3;

FIG. 6 is a schematic view of hydraulic controls enabling the remote operation of the intake system.

Figure 1:
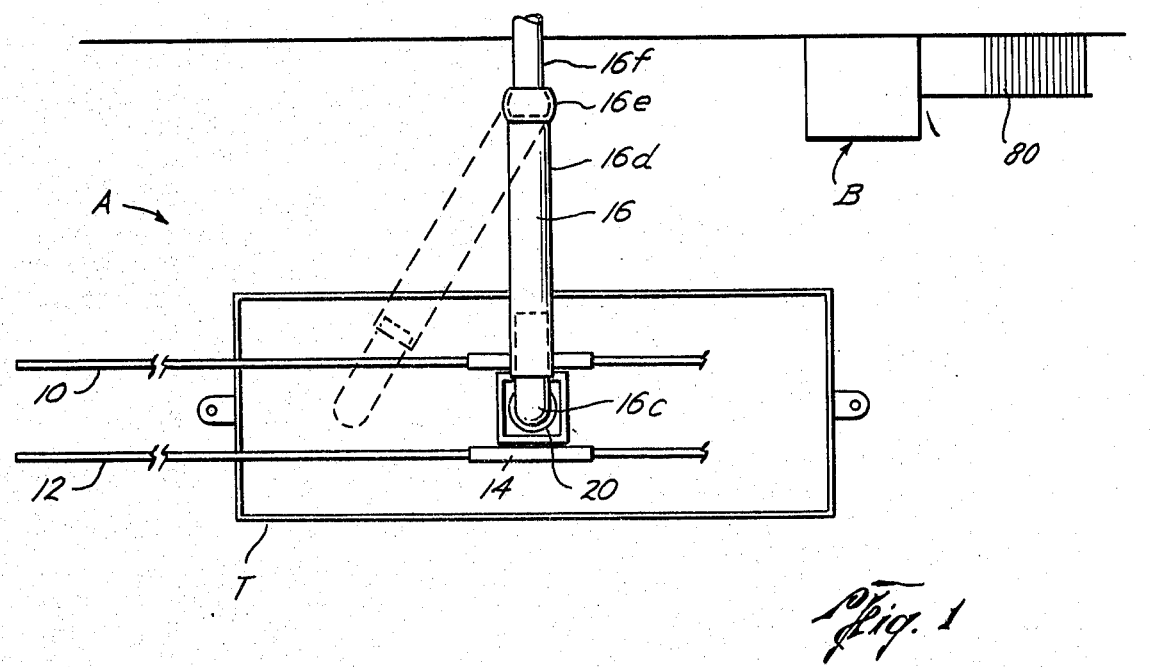
FIG. 1 is a plan view of the intake system of the present invention.
Figure 2:
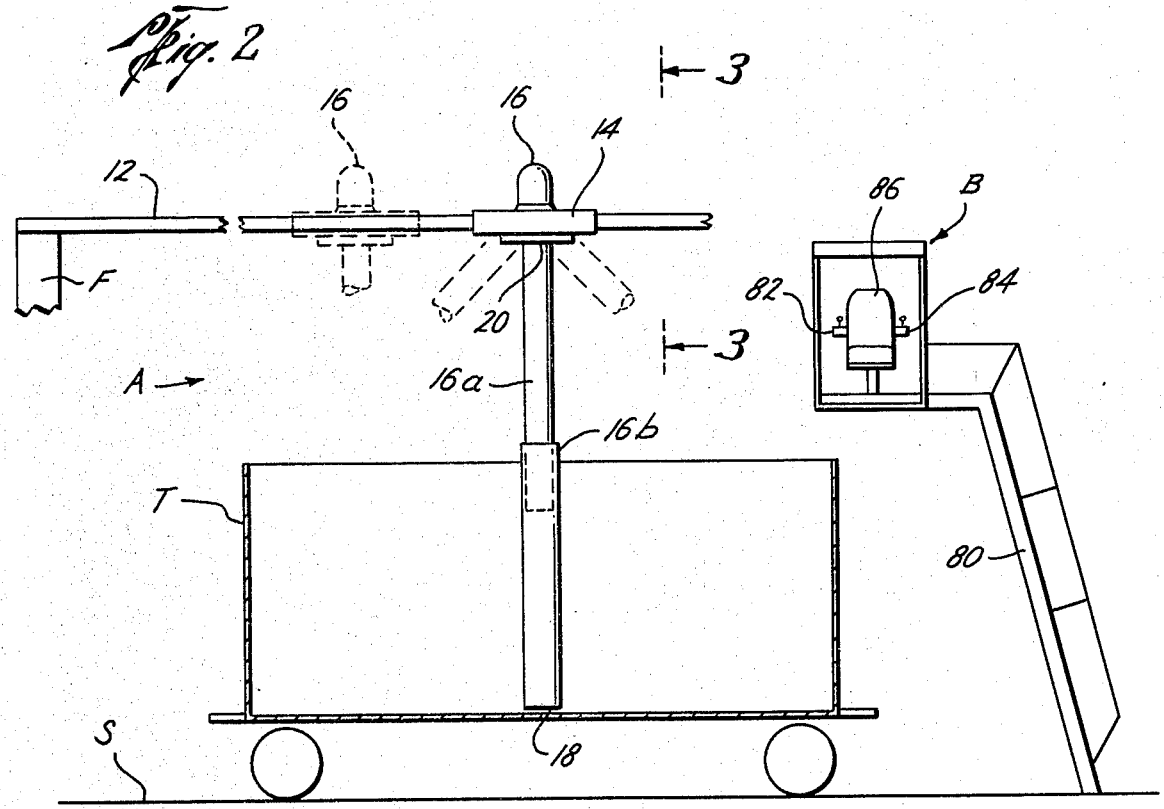
FIG. 2 is a side view of the intake system of the present invention.

Reference is made to FIGS. 1 and 2 where the intake apparatus of the present invention, generally designated A, is illustrated. Positioned on a loading surface S is a cart or trailer T filled with flowable material to be unloaded by the intake apparatus A.

While the trailer T is illustrated as being positioned on the loading surface S it will be understood by those skilled in the art that other means of placing the flowable product to be handled by the intake apparatus A on the loading surface S may be used.

The intake apparatus A includes a support frame, generally designated F which may be of any desired configuration. The details of construction of the frame F are well known to those skilled in the art and are not illustrated in detail. The frame F includes a pair of overhead parallel rails or tracks 10 and 12 upon which a carriage 14 may be moved. Mounted with the movable carriage 14 is a conduit or tube 16.

As best illustrated in FIG. 2, the inlet conduit 16 includes a downwardly extending portion 16a supported from the carriage 14 and having a telescoping lower portion 16b having an open inlet end 18. The inlet conduit 16 includes a first flexible connection or joint, generally designated 20, at the carriage 14 which will be described in greater detail hereinafter. The flexible joint 20 enables the lower inlet conduit telescoping portion 16a and 16b to move between the positions illustrated in phantom in FIG. 2.

Disposed above the flexible connection 20 is a 90° elbow 16c having an extension received in a telescoping portion 16d for enabling movement of the carriage by telescoping in the manner illustrated in phantom in FIG. 1. The portion 16d of the inlet conduit 16 connects through a second flexible connector at 16e with a fixed portion 16f of the inlet conductor. The fixed inlet conductor 16f communicates with the pneumatic conveying system in the manner well known to those of ordinary skill in the art and which pneumatic conveying system does not form part of the present invention.

The flexible connection 16e between the portion 16f and 16d of the tubular connector can be the usual ball and socket type universal connector or it may be pivoted about a single axis since the carriage moves in a single plane. However, both such flexible connections are well known to those skilled in the art.

The movable support carriage 14 is illustrated in greater detail in FIGS. 3, 4 and 5. The carriage 14 includes parallel side plates 22 and 24 on opposite sides of the rail 12 and which mount a plurality of rollers 28a, 28b and 28d which roll on the upper and lower surfaces of the rail 12 for enabling movement to the carriage 14. A similar arrangement with plates 30 and 32 occurs around the rail 10. Between the parallel spaced plates 30 and 32 are disposed a plurality of journaled rollers 34a, 34b, 34c and 34d in a manner similar to that of the rollers between rollers 28a, 28b and 28d mounted between the plates 22 and 24. Operably secured to the roller 34a is a reversible hydraulic motor 37 for moving the carriage 14 along tracks 10 and 12.

Secured to the inboard facing plates 24 and 30 of the carriage 14 are inwardly projecting pivot pins 36 and 38 which share a common longitudinal axis as best illustrated in FIGS. 3 and 5. Support gimbals 40 and 42 receive the pins 36 and 38, respectively, for providing or effecting their support while providing a pivotal axis for a portion of the carriage 14 supported on the members 40 and 42 as will be further described. Secured to the downwardly extending support gimbals members 40 and 42 is a hollow rectangular box frame structure 44 that is free to pivot about the longitudinal axis of pins 36 and 38. Extending inwardly from opposite sides of the box frame 44 are support lugs 46 and 48 having upwardly extending support portions 50 and 52, respectively. Mounted on the upwardly extending support members 50 and 52 are inwardly projecting support pins 54 and 56, respectively, which share a common longitudinal axis for forming a pivot. The pins 54 and 56 are received within support lugs 16g and 16h secured on opposite sides of the inlet conductor 16a for effecting its support. As the pivot axis provided by the aligned pins 54 and 56 is at the same elevation as pivot pins 36 and 38 and the pivot axes are perpendicular the conductor 16a is provided with a universal pivot connection to the carriage 14.

As best illustrated in FIG. 3, a downwardly extending portion of 60 of the frame 44 pivotally mounts at 60a one end of a hydraulic cylinder 62. The movable piston rod 64 of the double acting hydraulic cylinder 62 is pivotally connected to the inlet conductor 16a at 64a in a suitable known manner. The double acting hydraulic cylinder 62 and the expansible and contractable piston rod 64 will effect pivoting movement of the conductor 16a in a first direction about the pivot axis formed by pins 54 and 56.

As best illustrated in FIG. 4 a second hydraulic cylinder 66 is disposed 90° from the cylinder 62 for effecting movement of the inlet conduit 16a in a second direction about the pivot axis formed by pins 36 and 38. The double acting cylinder 66 is pivotally connected to the extension 32a of the carriage plate 32 while the extendable and retractable piston rod 68 from the double acting hydraulic cylinder 66 is pivotally connected to the inlet conduit 16a at 68a. By controlling the extension length of the piston rods 68 and 64 from the hydraulic cylinders 66 and 62, respectively, the conduit 16a may be angled from the vertical through a cone generated by a surface 42° from the vertical.

As is also illustrated in FIG. 3 the downwardly extending portion of 16c of the inlet conduit is flared at 16cc. Suitable sealing means carried adjacent the upper end of the conductor 16a maintains a pneumatic seal between the conductor portion 16cc and the movable inlet conductor 16a during the movement of the conductor 16a by hydraulic cylinders 62 and 66.

Secured on the frame 44 and mounted on opposite sides of the conductor 16a are a pair of hydraulically actuated winches 70 and 72. Extending downwardly from the winches 70 and 72 are support cables 74 and 76 which are secured to the upper flange of the telescoping portion 16b of the inlet conduit 16. The operation of the winches 70 and 72 elevates or lowers the lower portion 16b along the portion 16a of the inlet conductor as desired. A suitable annular seal is effected between the inlet conductor portion 16a and 16b as is well known in the art. Such seal is also effected between the portion 16c and 16d of the inlet conductor.

Disposed remotely from the inlet conduit 16 at a suitable location for viewing the loading surface S is a control station or booth B as is illustrated in FIGS. 1 and 2. The booth is preferably elevated to increase the operator's view of the loading surface S and trailer T for effecting controlled movement of the inlet conduit 16 from the booth B. A ladder 80 provides operator access to and from the booth B which is preferably enclosed and air conditioned for operator comfort. Suitable hydraulic remote controls, illustrated as 82 and 84 in FIG. 2 are positioned adjacent the operator seat 86 for convenience of operation in the known manner.

The controls operated from the control booth B are illustrated schematically in FIG. 6. The control valves located in the booth B are of commercially available types and are known to those of ordinary skill in the art. The control valve 82 controls application of hydraulic pressure from a source that is usually a pump (not illustrated) to the reversible hydraulic motor 37 through the conduits 92 and 94. When the hydraulic fluid is applied to the motor 37 through the conduit 92 and vented through conduit 94 the motor 37 will operate the carriage in one direction along the tracks 10 and 12. When this flow direction of hydraulic pressure is changed the motor 37 will operate the carriage along the tracks in the other direction.

Control valve 84 in the booth B controls the flow of hydraulic fluid through the conduits 96 and 98 to the hydraulic winch motor 70 and through branches 96a and 98a to the winch motor 72. By placing the lift winches for the telescoping portion 16b of the inlet conduit 16 in parallel their operation is synchronized for lifting and lowering the telescoping portion 16b which will prevent binding of the telescoping portion 16b during operation.

The hydraulic controls 88 and 90 disposed in the control booth B control the position of the piston rods 68 and 64 extending from their respective double action hydraulic cylinders 66 and 62. As noted previously the extension in retraction of the piston rod 68 and 64 control the angular position of the inlet conduit 16 from the vertical. The remote control valve 88 controls hydraulic cylinder 62 through conduits 100 and 102 while the valve 90 controls the position of the piston rod 68 by the application of fluid pressure through the conduits 104 and 106.

OPERATION

In the use and operation of the present invention the intake apparatus is assembled in the manner illustrated which preferably is used at a cotton gin. However, the intake apparatus of the present invention is also useful with other relatively low density products. The fixed portion 16f of the intake apparatus A is connected to the typical pneumatic conveying system (not illustrated) of a cotton gin in the known manner.

The pneumatic conveying system is then started and which includes a blower on the discharge end of the system. Starting of the blower will create a vacuum at the inlet opening 18 of the inlet conduit 16b. The operator may then enter the control booth B and through operation of the control 84 will elevate the lower portion 16b to telescope over the portion 16a of the inlet conduit 16. At this time the trailer T or other form of boll cotton to be placed on the pneumatic conveying system is positioned on the loading surface S.

The operator will then use the hydraulic control 82 for operating the hydraulic motor 37 through conduit 92 or 94 to position the carriage 14 at a desired location above the trailer T. Control 84 will then operate the hydraulic winches 70 and 72 to extend the inlet conduit portion 16b in close proximity to the boll cotton where it will be sucked in the intake tube 16 by the pneumatic conveying system blower.

As the unloading of the trailer T continues the operator may find it desirable to position the inlet opening 18 at various positions in the trailer T. This can be accomplished without moving the carriage 14 by utilizing the remote controls 88 and 90 to extend or retract the piston rods 64 and 68 from the respective hydraulic cylinders 62 and 66, respectively.

The foregoing disclosure and description of the invention are illustrative and explanatory thereof, and various changes in the size, shape and materials as well as in the details of the illustrated construction may be made without departing from the spirit of the invention.

We claim:

1. An intake apparatus adapted for use with a pneumatic conveying system, including:

a support frame having a pair of spaced parallel rails adapted for positioning above a loading surface upon which the flowable material to be conveyed may be positioned;

a movable carriage movably mounted on said rails;

means with said carriage for effecting movement of said carriage on said frame rails;

means disposed remotely from said carriage and operably connected therewith for effecting desired movement of said carriage on said rails of said support frame;

an inlet conduit supported by said carriage and having an inlet opening disposed below said carriage and adjacent the loading surface for receiving the material to be conveyed;

hydraulic means for lengthening and shortening said inlet conduit below said carriage to position said inlet opening adjacent the material to be conveyed positioned on the loading surface;

control means disposed remotely from said inlet conduit and hydraulically connected with said inlet conduit for controlling the lengthening and shortening of said inlet conduit remotely from said inlet conduit;

said inlet conduit having a flexible connection adjacent said carriage for enabling movement of the portion of said inlet conduit in a cone shaped area below said carriage to selectively position the inlet opening adjacent the loading surface;

hydraulic means mounted with said movable carriage and said inlet conduit for moving said movable portion of said inlet conduit to selectively position the inlet opening in and to thereby define said cone shaped area below said carriage; and control means disposed remotely from said inlet conduit and hydraulically connected with said means for moving said inlet conduit for moving said inlet opening of said inlet conduit remotely from said inlet conduit wherein said inlet conduit is remotely moved by movement of said means for moving said carriage and said inlet conduit in the cone shaped area to facilitate movement of the flowable material into the inlet conduit and pneumatic conveying system by selectively positioning the inlet opening over the loading surface.

* * * * *